US010515535B1

(12) United States Patent
Dhullipala Chenchu et al.

(10) Patent No.: US 10,515,535 B1
(45) Date of Patent: Dec. 24, 2019

(54) SYSTEM AND METHOD TO PROVIDE A MISPLACEMENT NOTIFICATION

(71) Applicant: GENERAL MOTORS LLC, Detroit, MI (US)

(72) Inventors: Ravikiran Dhullipala Chenchu, Canton, MI (US); Anil Kumar Nichenametla, Canton, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 16/111,284

(22) Filed: Aug. 24, 2018

(51) Int. Cl.
*G08B 21/24* (2006.01)
*G06T 7/00* (2017.01)
*G08B 21/22* (2006.01)
*B60Q 9/00* (2006.01)
*B60R 25/01* (2013.01)
*B60N 2/00* (2006.01)

(52) U.S. Cl.
CPC .............. *G08B 21/24* (2013.01); *B60N 2/002* (2013.01); *B60Q 9/00* (2013.01); *B60R 25/01* (2013.01); *G06T 7/97* (2017.01); *G08B 21/22* (2013.01); *G06T 2207/10004* (2013.01); *G06T 2207/30268* (2013.01)

(58) Field of Classification Search
CPC .......... G08B 21/24; G08B 21/22; G06T 7/97; G06T 2207/10004; G06T 2207/30268; B60N 2/002; B60Q 9/00; B60R 25/01
See application file for complete search history.

(56) References Cited

U.S. PATENT DOCUMENTS

| 6,263,272 | B1* | 7/2001 | Liu | B60H 1/243 236/44 C |
|---|---|---|---|---|
| 6,775,606 | B1* | 8/2004 | Ertl | B60N 2/002 340/426.2 |
| 9,747,795 | B1* | 8/2017 | Espinosa | G08B 13/19647 |
| 2005/0110637 | A1* | 5/2005 | Rao | G08B 21/0202 340/541 |
| 2006/0190419 | A1* | 8/2006 | Bunn | G06N 20/00 706/2 |
| 2007/0279206 | A1* | 12/2007 | Singfield | B60N 2/002 340/457 |
| 2009/0153312 | A1* | 6/2009 | Tanaka | B60Q 9/00 340/426.1 |

(Continued)

OTHER PUBLICATIONS

Mannes, J (Jun. 16, 2017) Google releases new Tensorflow Object Detection API. Retrieved from: https://techcrunch.com/2017/06/16/object-detection-api/.

*Primary Examiner* — Nathan J Flynn
*Assistant Examiner* — Tung T Trinh

(57) ABSTRACT

One general aspect includes a system to provide a misplacement notification, the system including: a memory configured to include a program and a processor configured to execute the program, where the program enables the processor to, after a vehicle ingress event, cause a sensor to capture a reference image of a portion of a vehicle interior; after a vehicle egress event, cause the sensor to capture a test image of the portion of the vehicle interior; determine whether the test image includes one or more objects not found in the reference image; and generate a notification, based on the determination of whether the test image includes one or more objects not found in the reference image.

18 Claims, 4 Drawing Sheets

(56) References Cited

U.S. PATENT DOCUMENTS

| | | | |
|---|---|---|---|
| 2013/0216094 A1* | 8/2013 | DeLean | G06K 9/00335 |
| | | | 382/103 |
| 2013/0265178 A1* | 10/2013 | Tengler | H04W 4/00 |
| | | | 340/989 |
| 2014/0309863 A1* | 10/2014 | Ricci | G01C 21/3484 |
| | | | 701/36 |
| 2015/0116103 A1* | 4/2015 | Yang | G08B 21/24 |
| | | | 340/438 |
| 2015/0137985 A1* | 5/2015 | Zafiroglu | B60R 16/02 |
| | | | 340/686.1 |
| 2015/0165932 A1* | 6/2015 | Maley | B60N 2/002 |
| | | | 340/457 |
| 2015/0350413 A1* | 12/2015 | Ma | H04M 1/72577 |
| | | | 455/418 |
| 2016/0082923 A1* | 3/2016 | Gavriel | B60R 22/48 |
| | | | 340/438 |
| 2016/0144781 A1* | 5/2016 | Kleinert | B60Q 9/00 |
| | | | 701/36 |
| 2016/0249191 A1* | 8/2016 | Avrahami | H04L 67/12 |
| 2016/0264097 A1* | 9/2016 | Oesterling | B60R 25/20 |
| 2016/0332535 A1* | 11/2016 | Bradley | B60N 2/002 |
| 2017/0098364 A1* | 4/2017 | Jaegal | G06K 9/00832 |
| 2017/0109987 A1* | 4/2017 | Auvenshine | B60R 21/01516 |
| 2017/0166121 A1* | 6/2017 | Biondo | B60Q 1/00 |
| 2017/0218678 A1* | 8/2017 | Kothari | E05F 15/73 |
| 2018/0015841 A1* | 1/2018 | Borgne | B60N 2/26 |
| 2018/0224849 A1* | 8/2018 | Gordon | G08B 21/24 |
| 2018/0236975 A1* | 8/2018 | Myers | B60R 25/25 |

\* cited by examiner

SYSTEM AND METHOD TO PROVIDE A MISPLACEMENT NOTIFICATION

INTRODUCTION

It is easy for vehicle drivers to put items in the backseat of their vehicle at the beginning of a trip and forget to remove these items after reaching their final destination. In the vehicle-share environment, once the items are left behind, it is nearly impossible for the past driver to reclaim their belongings. When a child or animal is left behind, such an incident can pose health and safety issues for the unattended child or animal. Accordingly, it is desirable to provide a system and method that will provide a misplacement notification when an item has been left in the backseat of a vehicle. It is also desirable for this system and method to further take one or more precautionary steps to protect a forgotten child, infant, or animal. Furthermore, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to provide a misplacement notification, the system including: a memory configured to include a program and a processor configured to execute the program, where the program enables the processor to, after a vehicle ingress event, cause a sensor to capture a reference image of a portion of a vehicle interior; after a vehicle egress event, cause the sensor to capture a test image of the portion of the vehicle interior; determine whether the test image includes one or more objects not found in the reference image; and generate a notification, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The system further including, after the vehicle ingress event, cause one or more vehicle interior lights to illuminate the vehicle interior in support of capturing the reference image; and after the vehicle egress event, cause the one or more vehicle interior lights to illuminate the vehicle interior in support of capturing the test image. The system further including where, when it is determined that the test image includes one or more objects not found in the reference image, access an image recognition database stored in the memory to recognize the one or more objects included in the test image; and release a vehicle door or contact an emergency services provider or some combination thereof only when the one or more objects included in the test image but not found in the reference image are recognized as a certain type. The system where the one or more objects included in the test image are recognized as an animal, child, or infant. The system where the notification is a text message configured to be exhibited on an interface of a mobile computing device. The system where the notification is an at least temporary activation of a vehicle horn system. The system where the portion of the vehicle interior is a seat cushion of a backseat located in the vehicle interior. The system where the vehicle ingress event is a vehicle ignition being turned to an ON state. The system where the vehicle ingress event includes a vehicle ignition being turned to an OFF state, a vehicle door being temporarily opened, and the vehicle door being locked. Implementations of the described techniques may include hardware, a method or process, or computer software on a computer-accessible medium.

One general aspect includes a method to provide a misplacement notification, the method including, after a vehicle ingress event, via a controller, causing a sensor to capture a reference image of a portion of a vehicle interior; after a vehicle egress event, via the controller, causing the sensor to capture a test image of the portion of the vehicle interior; determining, via the controller, whether the test image includes one or more objects not found in the reference image; and generating a notification, via the controller, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The method further including, after the vehicle ingress event, via the controller, causing one or more vehicle interior lights to illuminate the vehicle interior in support of capturing the reference image; and after the vehicle egress event, via the controller, causing the one or more vehicle interior lights to illuminate the vehicle interior in support of capturing the test image. The method further including: where, when it is determined that the test image includes one or more objects not found in the reference image, via the controller, accessing an image recognition database to recognize the one or more objects included in the test image; and releasing a vehicle door or contacting an emergency services provider or some combination thereof, via the controller, only when the one or more objects included in the test image but not found in the reference image are recognized as a certain type. The method where the one or more objects included in the test image are recognized as an animal, child, or infant. The method where the notification is a text message configured to be exhibited on an interface of a mobile computing device. The method where the notification is an at least temporary activation of a vehicle horn system. The method where the portion of the vehicle interior is a seat cushion of a backseat located in the vehicle interior. The method where the vehicle ingress event is a vehicle ignition being turned to an ON state. The method where the vehicle ingress event includes a vehicle ignition being turned to an OFF state, a vehicle door being temporarily opened, and the vehicle door being locked. Implementations of the described techniques may include hardware, a method or process, or computer software on a computer-accessible medium.

One general aspect includes a vehicle including a body and a vehicle door adapted to releasably engage the body; an interior including a backseat having a seat cushion and one or more vehicle interior lights configured to illuminate the vehicle interior; a camera positioned in the interior, the camera configured to capture an image of at least the seat cushion of the backseat; a memory that is disposed onboard the vehicle and configured to include a program; a processor that is disposed onboard the vehicle and configured to execute the program, where the program enables the processor to: after a vehicle ignition has been turned to an ON state, cause the one or more vehicle interior lights to illuminate the vehicle interior and then cause the camera to capture a reference image of at least the seat cushion of the backseat; after the vehicle ignition being turned to an OFF state, the vehicle door being temporarily opened, and the vehicle door being locked, cause the one or more vehicle interior lights to illuminate the vehicle interior and then cause the camera to capture a test image of at least the seat cushion of the backseat; determine whether the test image includes one or more objects not found in the reference image; and generate a text message configured to be exhibited on a interface of a mobile computing device or at least temporary activate a vehicle horn system or some combination thereof, based on the determination of whether the test image includes one or more objects not found in the reference image. Other embodiments of this aspect include corresponding computer systems, apparatus, and computer programs recorded on one or more computer storage devices, each configured to perform the actions of the methods.

Implementations may include one or more of the following features. The vehicle further including: where, when it is determined that the test image includes one or more objects not found in the reference image, access an image recognition database stored in the memory to recognize the one or more objects included in the test image; and release the vehicle door or contact an emergency services provider or some combination thereof only when the one or more objects included in the test image but not found in the reference image are recognized as an animal, child, or infant. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
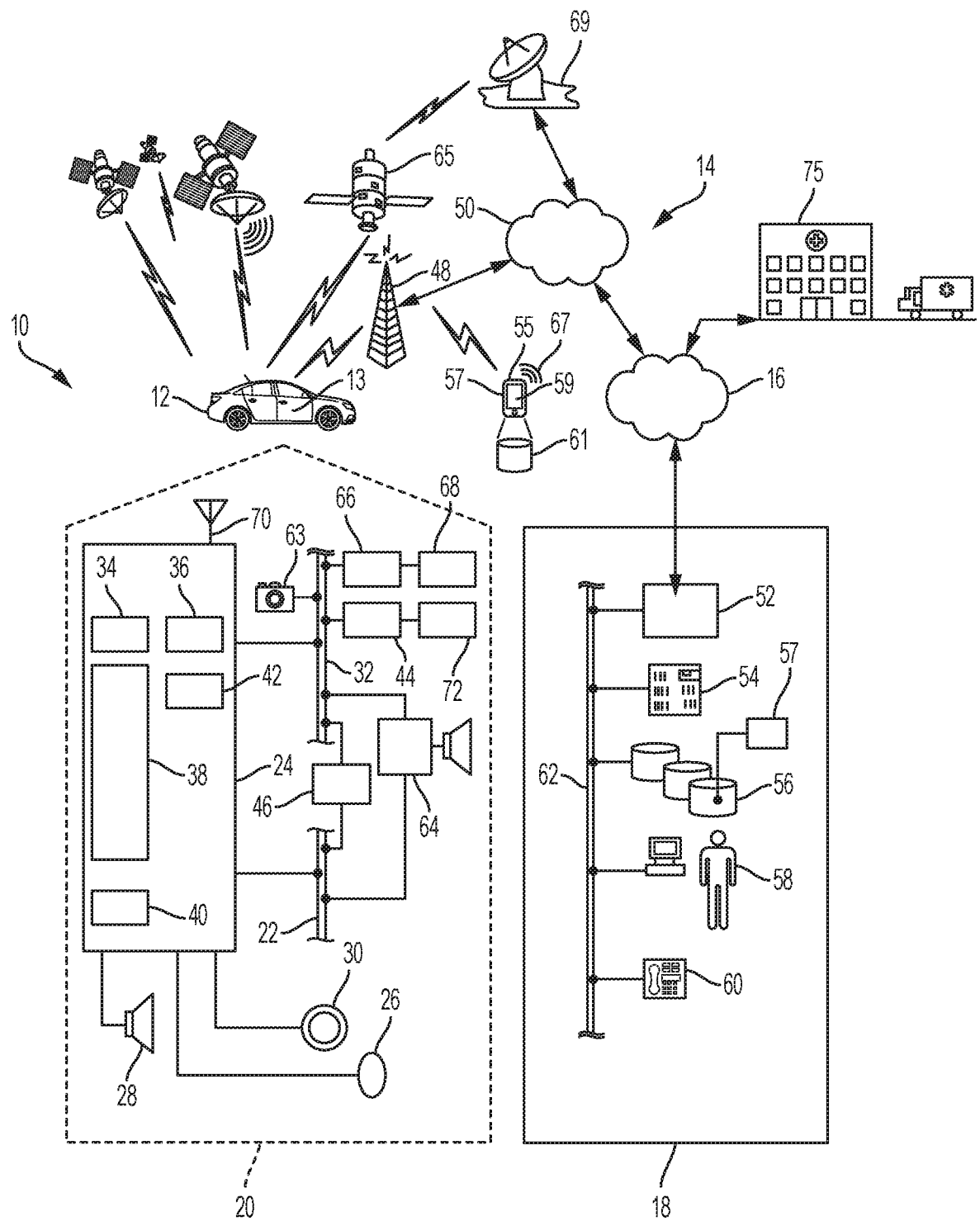
FIG. 1 is a block diagram depicting an embodiment of a communications system that is capable of utilizing the system and method disclosed herein, in accordance with exemplary embodiments.

As shown in FIG. 1, there is shown a non-limiting example of a communication system 10 that may be used together with examples of the system disclosed herein and/or to implement examples of the methods disclosed herein. Communication system 10 generally includes a vehicle 12, a wireless carrier system 14, a land network 16, a data center 18 (i.e., the backend), and an emergency services provider 75. It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Vehicle 12 may be any type of manually operated or autonomous vehicle such as a motorcycle, car, sports utility vehicle (SUV), truck, bus, bicycle, recreational vehicle (RV), construction vehicle (e.g., bulldozer), train, trolley, marine vessel (e.g., a boat), aircraft (e.g., airplane, helicopter, etc.), amusement park vehicle, farm equipment, golf cart, etc., and is equipped with suitable hardware and software that enables it to communicate over communication system 10. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the fundamental vehicle hardware 20 is shown generally in FIG. 1 including a telematics unit 24, a microphone 26, speaker 28, and buttons and/or controls 30 connected to telematics unit 24. Operatively coupled to telematics unit 24 is a network connection or vehicle bus 32. Examples of suitable network connections include a controller area network (CAN), WIFI, Bluetooth, and Bluetooth Low Energy, a media oriented system transfer (MOST), a local interconnection network (LIN), a local area network (LAN), and other appropriate connections such as Ethernet or those that conform with known ISO (International Organization for Standardization), SAE (Society of Automotive Engineers), and/or IEEE (Institute of Electrical and Electronics Engineers) standards and specifications, to name a few.

The telematics unit 24 can be an OEM-installed (embedded) or aftermarket communication system which provides a variety of services through its communications with the data center 18, and generally includes an electronic processing device 38, one or more types of electronic memory 40, a cellular chipset/component 34, wireless modem 36, an antenna system 70 including one or more antennas, and navigation unit containing a GPS chipset/component 42 capable of communicating location information via a GPS satellite system 69. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (that can be part of GPS component 42), or some or all navigation services can be done via telematics unit 24, wherein the location coordinate information is sent to a remote location for purposes of providing the vehicle with navigation maps, map annotations, route calculations, and the like.

The telematics unit 24 may provide various services including: turn-by-turn directions, map-based directions, and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a communication channel (voice channel and/or data channel) with wireless carrier system 14 so that both voice and/or data transmissions can be sent and received over the channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, satellite radio, compact disc (CD), digital video disc (DVD), and multimedia functionality independent of the infotainment center 46. Audio component 64 may contain a speaker system (which can be internally located in the vehicle interior or located on the exterior body of the vehicle 12) or may utilize speaker 28 (which can also be internally or externally located on the vehicle 12) via arbitration on vehicle bus 32 and/or audio bus 22.

A camera 63 is operatively connected to the vehicle bus 32. The camera 63 can be of the wide-angle or ultra-wide-angle variety and may be installed at various locations within an interior cabin of the vehicle 12 such as, for example, on the rear-view mirror, at some location on the ceiling of the vehicle interior, or on a seat backrest. The camera 63 can be angled such that second or third row seating (back seat) within in the interior cabin 17 (FIGS. 3A and 3B) is contained in the camera's 63 captured images. For example, one or more portions of the captured images may include the surfaces created by the seat cushions of these second or third row backseats. Skilled artisans will see that the camera 63 could also be angled such that the front row seats or various other locations within the cabin are contained in the camera's 63 captured images.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout vehicle 12 and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) features that provide myriad real-time data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. Another VSM 44 can be a body control module (BCM) that monitors and governs various electrical components located throughout the vehicle body like the vehicle's power door locks, power windows, air conditioner, tire pressure, lighting system, engine ignition, vehicle seat adjustment heating, mirrors, headlights, and horn system (which is configured to generate various audible warnings—chirps—as is generally known). Furthermore, as can be appreciated by skilled artisans, the above-mentioned VSMs are only examples of some of the modules that may be used in vehicle 12, as numerous others are also possible.

A passive entry passive start (PEPS) module 44, for instance, is another of the numerous of VSMs 44 and provides passive detection of the absence or presence of a passive physical key or a virtual vehicle key. When the passive physical key approaches, the PEPS module can determine if the passive physical key is authentic as belonging to the vehicle 12. The PEPS can likewise use authentication information received from data center 18 to determine if a mobile computing device 57 with virtual vehicle key is authorized/authentic to vehicle 12. If the virtual vehicle key is deemed authentic, the PEPS can send a command to BCM 44 permitting access to the vehicle 12. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48 (only one shown), one or more cellular network infrastructures (CNI) (not shown), as well as any other networking components required to connect wireless carrier system 14 with land network 16.

Land network 16 can be a conventional land-based telecommunications network connected to one or more landline telephones, and that connects wireless carrier system 14 to data center 18 as well as emergency services provider 75 (i.e., a fire department, hospital or police station having uniformed or otherwise identified employees or contractors). For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, and/or GPS module 67 capable of receiving GPS satellite signals and generating GPS coordinates based on those signals. User interface 59 may be embodied as a touch-screen graphical interface capable of user interaction as well as exhibiting information. Digital camera 55 may include the ability to generate bitmapped data representations of captured tangible object images through generally known operations. Examples of the mobile computing device 57 include the IPHONE™ and APPLE WATCH™ each being manufactured by Apple, Inc. and the GALAXY™ smart phone manufactured by Samsung Electronics Company as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 24 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate how this occurs—upon receiving a request, data center 18 will generate an encrypted virtual vehicle key to permit vehicle access via mobile computing device 57. Data center 18 will then transmit aspects this encrypted virtual vehicle key information to both mobile computing device 57 and the PEPS module 44 via telematics unit 24. After paring has been established, mobile computing device 57 will send its virtual vehicle key aspect to telematics unit 24 for recognition in light of its stored corresponding virtual key aspect and in turn the PEPS module may establish mobile computing device 57 as the acting key fob for vehicle 12. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58, as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58, or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 56, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store information in the form of executable instructions such as, but not limited to, one or more application program interface (API) suites. One API suite can incorporate numerous vehicle-share services records (i.e., vehicle reservation information) each having information related to vehicle 12 such as, but not limited to, vehicle-share vehicle records (e.g., vehicle VSM information, vehicle system verification information/alerts, vehicle anomaly information), information related to the user such as, but not limited to, reservation account records (e.g., vehicle comfort settings information, driving record information, telematics unit settings, or vehicle make-model preferences), and information related to organizing vehicle reservations as well as fleet management such as, but not limited to, reservation profile records (e.g., reservation calendar information, vehicle assignment information, parking information, third party contact information, etc.); or any other pertinent vehicle-share system information. These records could moreover be written in SQL as well as be copied, organized, and/or stored in a tabular form to allow for continuous, real-time updates. The records may be accessible to the user, data center 18, or one or more third parties. The vehicle-share records can additionally collaborate with a reservation account (discussed below) for support of, for example, reservation management and fleet management.

The user of mobile computing device 57 may create their own personalized vehicle reservation account to be stored in mobile memory 61 and which may have access to the vehicle-share records at the backend. The user may perform tasks to create this account through a variety of frontend devices such as, for example, through a remote computer and mobile computing device 57. This reservation account may be uploaded to or accessible on server 54 (i.e., to support backend functions). Data center 18 may also access one or more additional remote servers and/or remote databases (e.g., Department of Motor Vehicles, weather databases, traffic databases, etc.) to receive information in support of establishing the reservation account as well as a particular reservation and one or more vehicle-share services records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account therefrom. The reservation account may moreover include one or more prompts to instruct the user to provide information (e.g., validating data) to support account creation. Reservation account may also provide one or more prompts to assist a vehicle-share system user in reserving a fleet vehicle by operatively accessing and communicating with the backend vehicle-share services records.

As mentioned above, emergency services provider 75 can be an emergency services dispatch for a hospital, police station, fire department, or some other type of emergency medical technician group. As follows, the emergency services provider 75 has uniformed or otherwise identified employees or contractors that are specifically trained to rescue helpless victims from unfortunate situations. For example, in response to an emergency request, employees/contractors of the emergency services provider 75 can rescue helpless animals, children, or infants from being trapped in the interior cabin 17 of the otherwise assumingly unoccupied vehicle 12. In order to rescue these helpless victims, the employees/contractors may have to use tools to unlock vehicle door 13 or they may have to contact live advisor 58 to remotely unlock the vehicle door 13.

Method

Figure 2:
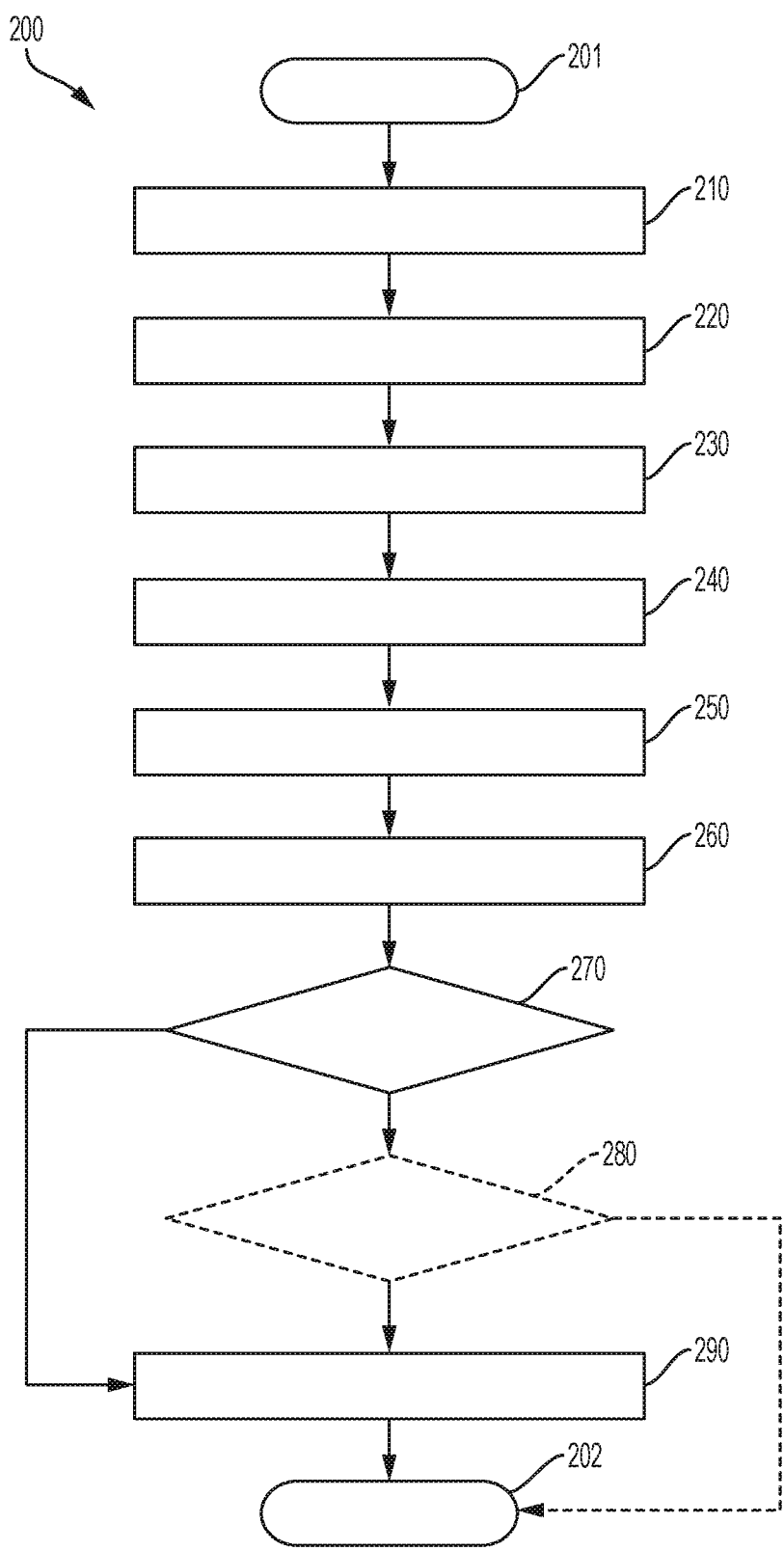
FIG. 2 is a flowchart of an exemplary process for providing a misplacement notification when one or more objects have been accidentally left in the backseat of a vehicle in accordance with one or more exemplary embodiments.
Figure 3A:
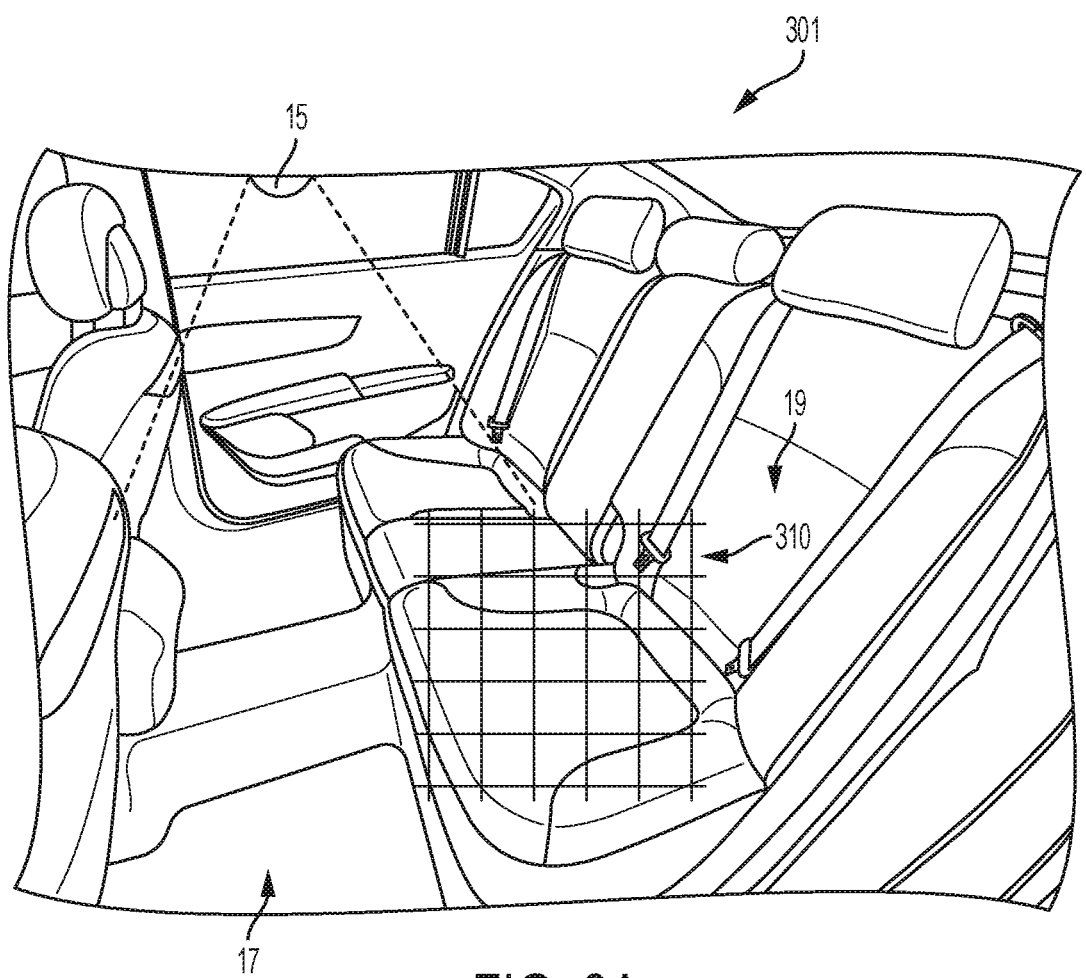
FIG. 3A depicts an application of an exemplary aspect of the process of FIG. 2 in accordance with one or more exemplary embodiments.

Now turning to FIG. 2, there is shown an embodiment of a method 200 for generating and transmitting a misplacement notification when one or more objects have been unintentionally left in the backseat of a vehicle. One or more aspects of notification method 200 may be completed through telematics unit 24 which may include an electronic processing device 38 (processor) to execute one or more programs contained electronic memory 40. One or more aspects of method 200 may also be completed by data center 18, for example, via server 54 accessing an image recognition database stored in databases 56. One or more ancillary aspects of method 200 may be completed by camera(s) 63 (sensor), audio component 64, door 13, and vehicle interior light 15 (FIG. 3A). Method 200 is supported by the PEPS module 44 being configured to establish a short range wireless communication protocol (SRWC protocol) with a virtual vehicle key fob when the mobile computing device 57 is within proximity of vehicle 12. Method 200 is also supported by the BCM 44 being configured to cause the power door locks to unlock the door 13 as well as release the door latch and cause the door to open. Method 200 is also supported by audio system 64 being configured to generate an audible warning. Method 200 is also supported by the BCM 44 being configured to cause the horn system to generate an audible warning, unlock the vehicle doors, and open the power windows. These configurations may be established by a manufacturer at or around the time of the vehicle's assembly. The method 200 is further yet supported by preconfiguring infotainment module to exhibit information such as notifications on its graphics display.

Method 200 begins at 201 in which the user comes into proximity of vehicle 12 so as to establish a SRWC between one or more of the vehicle modules 44 (e.g., PEPS modules) and a mobile computing device 57 (having a virtual key fob stored thereon) or physical key fob on the person of the user. Moreover, the method begins when the PEPs module 44 determines that the physical/virtual key fob is authentic as belonging to vehicle 12 and the PEPs module permits at least temporary access to vehicle 12 via the mobile computing device 57 or physical key fob. In the vehicle-share system scenarios, method 200 may also begin at the start of a vehicle reservation.

In step 210, the user triggers a vehicle ingress event. In various embodiments, this event occurs when the user unlocks the vehicle door 13 via their virtual/physical key fob, gets into the vehicle 12 and subsequently turns the vehicle ignition to the ON state (i.e., starting the vehicle ignition in order to operate the vehicle).

In step 220, upon the ignition being started, telematics unit 24 will immediately wake up camera 63 (e.g., installed on the rearview mirror, at some location on the interior ceiling, or on the backside of the backrest of a vehicle seat). As such, power from the vehicle's battery (not shown) will be temporarily provided to camera 63 so it can be activated and capable of capturing one or more images. In this step, in various embodiments, a light sensor 122 may detect whether it is day or night in the vehicle environment. When it is determined that it is night outside, power may also be provided to the vehicle interior light 15 to illuminate the interior cabin 17 and help minimize lighting differences in the interior cabin.

In step 230, telematics unit 24 will activate the camera 63. With additional reference to FIG. 3A, the telematics unit 24 will moreover cause the camera 63 to capture an image 301 of, for example, of one or more seat cushions of the backseat 19. In various embodiments, the telematics unit 24 may alternatively or simultaneously activate a second camera 63' installed elsewhere in the interior 17 to capture a supporting image of the same seat cushion(s) for the purposes of accuracy. When it is night outside of the vehicle 12, the illuminated interior 17 will also support the visibility of the seat cushion as well as the rest of the backseat 19. It should be understood that even though a second-row backseat 19 is shown, the camera 63 may also capture a front row seat as well as a third or fourth-row backseat 19 in certain types of vehicles 12 (in such instances, the camera(s) 63 will be placed around the vehicle interior 17 accordingly). It should also be understood that this captured image 301 or images should be considered a "reference image" or "reference images."

In step 240, the user operates the vehicle for some duration of time. For example, the user drives the vehicle to a grocery store.

Figure 3B:
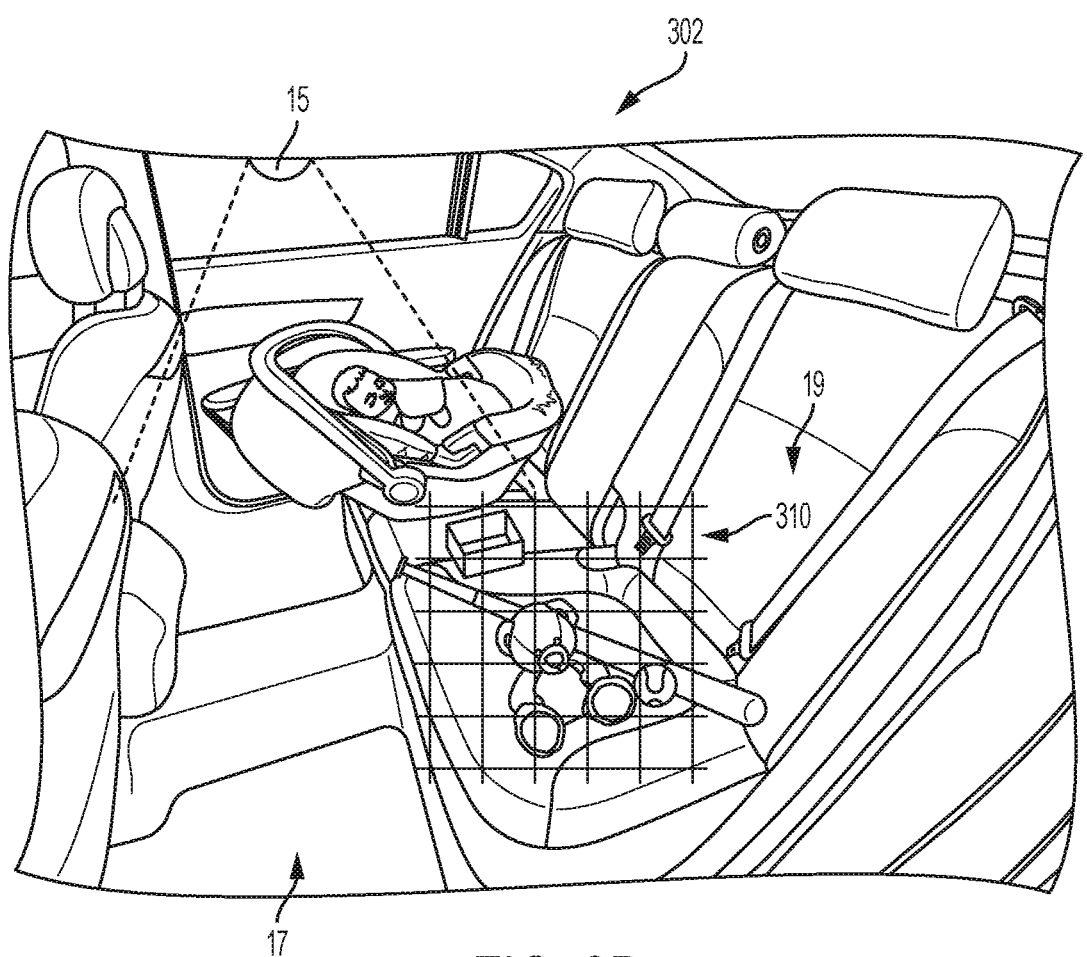
FIG. 3B depicts an application of another exemplary aspect of the process of FIG. 2 in accordance with one or more exemplary embodiments.

In step 250, with additional reference to FIG. 3B, after the user arrives at their destination (e.g., the grocery store) the user triggers a vehicle egress event. In various embodiments, this event occurs when the user puts the vehicle 12 in park, turns the vehicle ignition to an OFF state (i.e., powering down the vehicle ignition in order to cease vehicle operations), opens the vehicle door 13, gets out of the vehicle, closes the vehicle door 13 behind them, and then locks the vehicle door 13. Alternatively, in vehicle-share scenarios, the egress event may additionally be triggered when the vehicle reservation is complete.

Moreover, in this step, telematics unit 24 will reactivate the camera 63 (previously activated in step 230) and capture a second image 302 of the locations of the vehicle interior 17 previously captured with the reference image(s). For example, the camera 63 will capture a second image of the one or more seat cushions of the same, previously captured backseat(s) 19. In various embodiments, telematics unit 24 may alternatively or simultaneously activate another interior camera 63' to capture a supporting image of the seat cushion for accuracy purposes. The camera 63 may also be adjusted to the settings which were defined when the camera 63 first captured the reference image 301. It should be understood that this second captured image 302 (or second set of captured images) should be considered a "test image" or "test images." In certain embodiments, when it is nighttime and prior to the reactivation of camera 63, power may also be provided to the vehicle interior light 15 to illuminate the interior cabin 17, to minimize lighting differences, and to provide visibility of the seat cushion as well as the rest of the backseat 19 and in support of properly capturing the test image.

In step 260, in various embodiments, telematics unit 24 will transmit the reference image and test image to data center 18. In step 270, server 54 will perform one or more generally known object detection techniques to determine whether an object has been left on the backseat of the vehicle interior 17. For example, controller 128 can perform this image analysis by comparing the test image 302 (FIG. 3B) to the reference image 301 (FIG. 3A) at the pixel level to determine if the test image includes an object not found in the reference image. Thus, since the scene in the captured images should be static and the images are captured somewhat close in time, the reference and test images should be practically identical unless objects are unintentionally left in back of the vehicle cabin 17. If such objects are found to be resting on the cushion of the backseat 19, then the pixels 310 in the area(s) where the objects are found will have different characteristics such as, for example, different color(s) and intensity. As follows, when a certain number of pixels 310 are found to have unique characteristics not seen in the reference image 301 (e.g., on the backseat cushion 19), for example—50 pixels, these differences would indicate one or more objects have been accidentally left behind. Furthermore, if the test image 302 includes one or more objects not found in the reference image, method 200 can move to optional step 280; otherwise, method 200 will move to completion 202. It should be understood that only certain pixel clusters 310 can be seen in the reference image 301 and test image 302, however, skilled artists will understand that the entire area of these images should comprise pixels.

In optional step 280, server 54 performs a generally known object recognition technique (WATSON VISUAL RECOGNITION™ by IBM or TENSOFLOW™ by GOOGLE) to recognize the objects included in the test image. For instance, server 54 can access an image recognition database from databases 56 (a forgotten object recognition API) filled with training data that can be a number of sample images depicting various kinds of objects which may accidentally be left behind in a vehicle (e.g., groceries, sports equipment, animals, children, plants, etc.). Moreover, server 54 can then search this database for a sample image that depicts an object of similar characteristics (size, color, pattern, shape, etc.) to at least one of the unique objects discovered in the test image. If the search uncovers a sample image including an object of identical or substantially similar characteristics to the object found in the test image, then the object in the test image will be recognized as the object associated with the sample image. The object in the test image may also be provided a percentage designation to indicate how certain the server 54 is that the object falls within the category of similar objects found in the database. After such a determination, server 54 may also provide the test image 302 to this image recognition database, to be added to the training data. Once the object in the test image 302 has been recognized, method 200 moves to step 290.

If the search cannot find a sample image with an object like the one found in the test image 302, server 54 may transmit the test image 302 to mobile computing device 57 (e.g., the smart phone associated with the user's reservation account) as a notification displayed on the user interface 59, so as to let the user of mobile computing device 57 know something may have been forgotten in the vehicle 12. This test image notification may also be accompanied by a visible text message also displayed on the user interface 59. For example, this supporting text message may state: "WARNING, PLEASE REVIEW THE ACCOMPANYING IMAGE CAREFULLY TO MAKE SURE THE OBJECT IN THIS IMAGE IS NOT AN ITEM ACCIDENTALLY LEFT BEHIND IN THE VEHICLE." After this image notification has been sent to mobile computing device 57, method 200 will move to completion 202. In an alternative embodiment, if the search cannot find a sample image with an object like the one found in the test image 302, server 54 can determine that the object detection technique has produced a false positive and method 200 will move straight to completion 202. An example of a false positive would be when a tree leaf has somehow fallen onto the seat cushion (e.g., through an open window) sometime between the capturing of the reference and test image.

In step 290, server 54 will generate a notification for the user and will collaborate with telematics unit 24 and/or mobile computing device 57 to implement this notification. In one embodiment, this notification is embodied as a visible text message displayed on the user interface 59 of the user's mobile computing device 57 or on an outward facing display located somewhere on the vehicle's 12 body. For example, this text message may state: "WARNING: CHECK REAR SEAT FOR MISLAID ITEMS" or the like. The test image 302 may also be sent to support this text message notification. In another embodiment, the notification is audible warning from a vehicle exterior located audio component 64 (e.g., outwardly facing speakers installed on the vehicle body) such as, for example, chirps or dings (e.g., via an electronic/software chime module) or an audio message stating: "WARNING: PLEASE CHECK REAR SEAT FOR MISLAID ITEMS." In another embodiment, the notification is a temporary activation of the horn system (i.e., causing sequential light sounding horn honks). Skilled artists will see that server 54 may simultaneously generate and implement multiple notification embodiments (e.g., implementing both the text and audio messages at the same time). Server 54 may also collaborate with the BCM 44 to unlock one or more vehicle doors 13 at the same time that the notification is being provided (this may be regardless of whether a vehicle-share reservation has come to completion).

In addition, when an object recognition technique is performed and the object in the test image is recognized as a certain type, in step 290, server 54 may take additional precautionary steps to protect the object(s) found in the backseat. For example, if the object recognition technique recognizes the object left behind as a helpless animal, child, or infant, server 54 may remotely command the BCM 44 to cause the door 13 to be unlocked and/or released from the door fame (i.e., by sequentially unlocking, unlatching, and rotating away or sliding open the door 13). Alternatively, or simultaneously, server 54 may also remotely command BCM 44 to open one or more power windows of the vehicle 12 in an effort to ventilate the vehicle interior. Server 54 may additionally or alternatively contact the emergency services provider 75 that there is a helpless animal, child, or infant trapped in vehicle 12. As follows, server 54 may collaborate with GPS chipset/component 42 to get the location of vehicle 12 and also provide that location to the emergency services provider 75. After step 280, method 200 moves to completion 202. It has also been envisioned, that the object in the test image is recognized as an object commonly left in the back seat of the vehicle 12 (e.g., a baseball bat and ball often left in the backseat) or the type of object generally known to be left in vehicles (e.g., a pack of gum or magazines), then server 54 will refrain from generating a notification for the user and method 200 will move from optional step 280 to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for,"

What is claimed is:

1. A system to provide a misplacement notification, the system comprising:
a memory configured to comprise a program and a processor configured to execute the program, wherein the program enables the processor to:
after a vehicle ingress event, cause a sensor to capture a reference image of a portion of a vehicle interior;
after a vehicle egress event, cause the sensor to capture a test image of the portion of the vehicle interior, wherein the vehicle ingress event comprises a vehicle ignition being turned to an OFF state, a vehicle door being temporarily opened and subsequently closed, and the vehicle door being locked after being closed;
determine whether the test image includes one or more living beings not found in the reference image;
generate a notification, based on the determination of whether the test image includes one or more objects not found in the reference image, wherein the notification is configured to notify an emergency services provider that the one or more living beings are trapped in an interior of the vehicle, wherein the emergency services provider comprises uniformed or otherwise identified personnel trained to rescue living beings from the interior of the vehicle;
generate vehicle location data;
send the notification and vehicle location data to the emergency services provider;
cause the vehicle door to be unlocked and subsequently cause the vehicle door to be released from a door frame; and
open one or more power windows of the vehicle to ventilate the interior of the vehicle.

2. The system of claim 1, further comprising:
after the vehicle ingress event, cause one or more vehicle interior lights to illuminate the vehicle interior in support of capturing the reference image; and
after the vehicle egress event, cause the one or more vehicle interior lights to illuminate the vehicle interior in support of capturing the test image.

3. The system of claim 1, further comprising:
wherein, when it is determined that the test image includes one or more living beings not found in the reference image, access an image recognition database stored in the memory to recognize the one or more living beings included in the test image.

4. The system of claim 3, wherein the one or more living beings included in the test image are an animal, child, or infant.

5. The system of claim 1, wherein the notification further comprises a text message configured to be exhibited on an interface of a mobile computing device.

6. The system of claim 1, wherein the notification i-s further comprises an at least temporary activation of a vehicle horn system.

7. The system of claim 1, wherein the portion of the vehicle interior is a seat cushion of a backseat located in the vehicle interior.

8. The system of claim 1, wherein the vehicle ingress event is a vehicle ignition being turned to an ON state.

9. A method to provide a misplacement notification, the method comprising:

after a vehicle ingress event, via a controller, causing a sensor to capture a reference image of a portion of a vehicle interior;
after a vehicle egress event, via the controller, causing the sensor to capture a test image of the portion of the vehicle interior, wherein the vehicle ingress event comprises a vehicle ignition being turned to an OFF state, a vehicle door being temporarily opened and subsequently closed, and the vehicle door being locked after being closed;
determining, via the controller, whether the test image includes one or more living beings not found in the reference image; and
generating a notification, via the controller, based on the determination of whether the test image includes one or more objects not found in the reference image, wherein the notification is configured to notify an emergency services provider that the one or more living beings are trapped in an interior of the vehicle, wherein the emergency services provider comprises uniformed or otherwise identified personnel trained to rescue living beings from the interior of the vehicle;
generating, via the controller, vehicle location data;
sending, via the controller, the notification and vehicle location data to the emergency services provider;
causing, via the controller, the vehicle door to be unlocked and subsequently causing, via the controller, the vehicle door to be released from the door frame; and
opening, via the controller, one or more power windows of the vehicle to ventilate the interior of the vehicle.

10. The method of claim 9, further comprising:
after the vehicle ingress event, via the controller, causing one or more vehicle interior lights to illuminate the vehicle interior in support of capturing the reference image; and
after the vehicle egress event, via the controller, causing the one or more vehicle interior lights to illuminate the vehicle interior in support of capturing the test image.

11. The method of claim 9, further comprising:
wherein, when it is determined that the test image includes one or more living beings not found in the reference image, via the controller, accessing an image recognition database to recognize the one or more living beings included in the test image.

12. The method of claim 11, wherein the one or more living beings included in the test image are an animal, child, or infant.

13. The method of claim 9, wherein the notification further comprises a text message configured to be exhibited on an interface of a mobile computing device.

14. The method of claim 9, wherein the notification further comprises an at least temporary activation of a vehicle horn system.

15. The method of claim 9, wherein the portion of the vehicle interior is a seat cushion of a backseat located in the vehicle interior.

16. The method of claim 9, wherein the vehicle ingress event is a vehicle ignition being turned to an ON state.

17. A vehicle comprising:
a body and a vehicle door adapted to releasably engage the body;
an interior including a backseat having a seat cushion and one or more vehicle interior lights configured to illuminate the vehicle interior;
a camera positioned in the interior, the camera configured to capture an image of at least the seat cushion of the backseat;

a memory that is disposed onboard the vehicle and configured to comprise a program;

a processor that is disposed onboard the vehicle and configured to execute the program, wherein the program enables the processor to:

after a vehicle ignition has been turned to an ON state, cause the one or more vehicle interior lights to illuminate the vehicle interior and then cause the camera to capture a reference image of at least the seat cushion of the backseat;

after the vehicle ignition being turned to an OFF state, the vehicle door being temporarily opened and subsequently closed, and the vehicle door being locked after being closed, cause the one or more vehicle interior lights to illuminate the vehicle interior and then cause the camera to capture a test image of at least the seat cushion of the backseat;

determine whether the test image includes one or more living beings not found in the reference image; and based on the determination of whether the test image includes one or more objects not found in the reference image, generate a text message configured to be exhibited on an interface of a mobile computing device and at least temporary activate a vehicle horn system or some combination thereof and generate a notification configured to notify an emergency services provider that the one or more living beings are trapped in an interior of the vehicle, wherein the emergency services provider comprises uniformed or otherwise identified personnel trained to rescue living beings from the interior of the vehicle;

generate vehicle location data;

send the notification and vehicle location data to the emergency services provider;

cause the vehicle door to be unlocked and subsequently cause the vehicle door to be released from the door frame; and open one or more power windows of the vehicle to ventilate the interior of the vehicle.

18. The vehicle of claim 17, further comprising:

wherein, when it is determined that the test image includes one or more living beings not found in the reference image, access an image recognition database stored in the memory to recognize the one or more living beings included in the test image.

* * * * *